Figure 1:
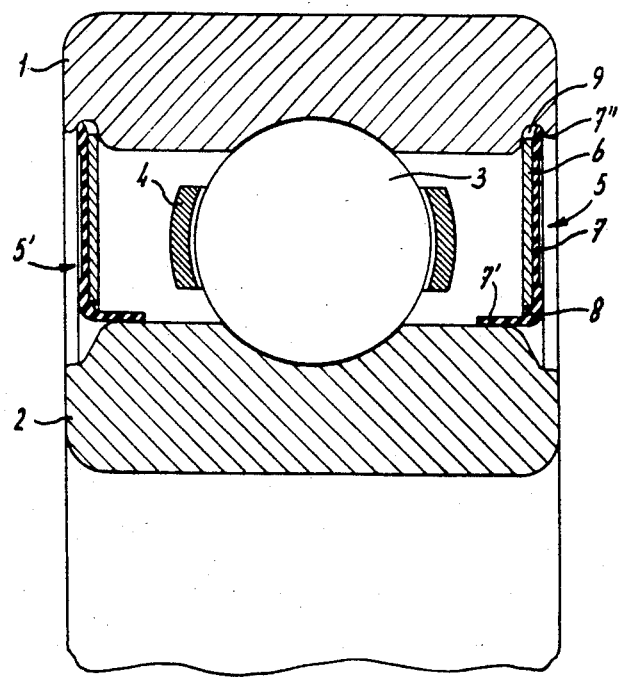

United States Patent [19]

Korenhof

[11] Patent Number: 4,605,319
[45] Date of Patent: Aug. 12, 1986

[54] SEALING RING FOR A ROLLING BEARING

[75] Inventor: Abraham Korenhof, Damhertlaan, Netherlands

[73] Assignee: SKF Industrial Trading and Development Company B.V., Nieuwegein, Netherlands

[21] Appl. No.: 614,803

[22] Filed: May 29, 1984

[30] Foreign Application Priority Data

Jun. 9, 1983 [NL] Netherlands ............ 8302055

[51] Int. Cl.⁴ ........................................... F16C 33/78
[52] U.S. Cl. .................................................... 384/484
[58] Field of Search .............. 384/486, 484, 147; 277/29, 207 R, 134

[56] References Cited

U.S. PATENT DOCUMENTS

| | | | |
|---|---|---|---|
| 4,235,485 | 11/1980 | Reiter | 384/486 |
| 4,344,631 | 8/1982 | Winn | 277/29 |
| 4,350,347 | 9/1982 | Heinrich | 277/207 R |
| 4,505,484 | 3/1985 | Ohkuma et al. | 384/486 |

FOREIGN PATENT DOCUMENTS 0006995 6/1979 European Pat. Off.

Primary Examiner—Lenard A. Footland
Attorney, Agent, or Firm—Yuter, Rosen & Dainow

[57] ABSTRACT

A rolling bearing having an inner and outer race and at least one row of rolling members between the races, and sealing rings closing off the space between the races externally, each of which consists of an annular element of a rigid material, for example a metal, the outer edge of which is accommodated in an annular groove in the outer race of the rolling bearing and a sealing element, attached thereto, of an elastic material having a lip-shaped part which, with respect to the annular element, projects inward and rests against the inner race of the rolling bearing, characterized in that the annular element is a flat ring which closes off the space between the races, except for a relatively narrow slot between its inner peripheral edge and the inner race, and the sealing element of an elastic material likewise has essentially the shape of a flat ring, the outer peripheral part of which and the element of a rigid material are joined, so that the inner peripheral part projects outside the inner periphery of the rigid element, which projecting part is directed inward and the outer surface of which rests against the inner race, the length and/or the thickness of said abutting part being greater than the breadth of the slot.

14 Claims, 3 Drawing Figures

SEALING RING FOR A ROLLING BEARING

The invention concerns a rolling bearing comprising an inner and outer race and at least one row of rolling members between said races, and sealing rings closing off the space between the races externally, each of which consists of an annular element of a rigid material, for example a metal, the outer edge of which is accommodated in an annular groove in the outer race of the rolling bearing and a sealing element of an elastic material, attached thereto and comprising a lip-shaped part which with respect to the annular element projects inward and rests against the inner race of the rolling bearing. A rolling bearing having sealing rings of such type is disclosed in European patent application No. 006,995.

In a rolling bearing sealing rings generally serve for retaining a lubricant inside the bearing and to prevent dirt from getting into the bearing from outside.

In the known sealing ring the annular element of a rigid material has the shape of a saucer with a flat annular bottom and with an outer peripheral edge, turned outward, which is accommodated in the annular groove in the outer race. The elastic sealing element is attached to the inner peripheral edge of the flat bottom of the saucer-shaped element of a rigid material and consists of an annular part, the inner periphery of which rests against the inner race and which lies in the prolongation of the said flat bottom, and a lip, directed slopingly inward, forming a whole therewith, a rounded-off surface of which lip rests against the inner race of the rolling bearing.

The disadvantage of the known sealing ring is that when a relatively free-flowing lubricant is used, the lubricant leaks outward along the sealing element. The use of a free-flowing lubricant is required, for example, in bearings of which it is required that as little sound as possible be produced in operation.

The object of the invention is to procure a sealing ring for a rolling bearing by which a leak-proof seal is obtained even for free-flowing lubricants.

This object is accomplished in that pursuant to the invention the annular element is a flat ring which closes off the space between the races, except for a relatively narrow slot between its peripheral edge and the inner race, and the sealing element of an elastic material likewise has essentially the shape of a flat ring, the outer peripheral part of which and the element of a rigid material are joined, so that the inner peripheral part projects beyond the inner periphery of said rigid element, which projecting part is directed inward and the outer surface of which rests against the inner race, the length and/or the thickness of said abutting part being greater than the width of the slot.

In this way, when in operation, the sealing element presses against the inner race, owing to the fact that the abutting part is elastic and in the space inside the bearing a slight overpressure prevails owing to increase in temperature. Owing to the relatively narrow slot between the element of a rigid material and the inner race, the part of the sealing element projecting inward cannot be pressed outward, so that a leak-free seal is obtained, while a very small portion of the lubricant creeps over a distance between the projecting part and the inner race, whereby lubrication between these parts is obtained so that no excessive frictional torques and accompanying temperature increases are produced.

A plurality of notches, spaced apart, are advantageously made in the inner periphery of the annular sealing element of elastic material, the inner peripheral edge of the annular sealing element of elastic material preferably being provided with a thickening directed inward.

In this way, owing to the thickening, the inner edge of the abutting part of the sealing element is slightly raised, whereby a small quantity of lubricant is better able to get, via the notches, between said part and the inner race of the rolling bearing, and an improved lubrication is obtained.

Owing to the very simple shape of the annular element of a rigid material, a second element of an elastic material in the shape of a flat ring may advantageously be attached to said annular element of a rigid material, the outer peripheral edge of which projects outside the outer peripheral edge of the annular element of a rigid material to from a snap fastening for the sealing ring in the annular groove in the outer race of the rolling bearing.

The second elastic element preferably forms a whole with the sealing element.

The invention is described in greater detail with reference to the drawing, where examples of the invention are shown and wherein FIG. 1 shows, in axial cross section, a rolling bearing with sealing rings pursuant to the invention.

Figure 2:
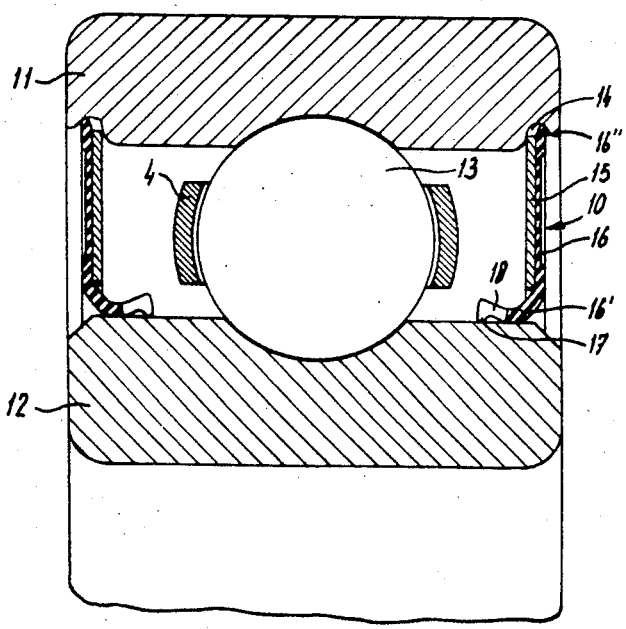
Figure 3:
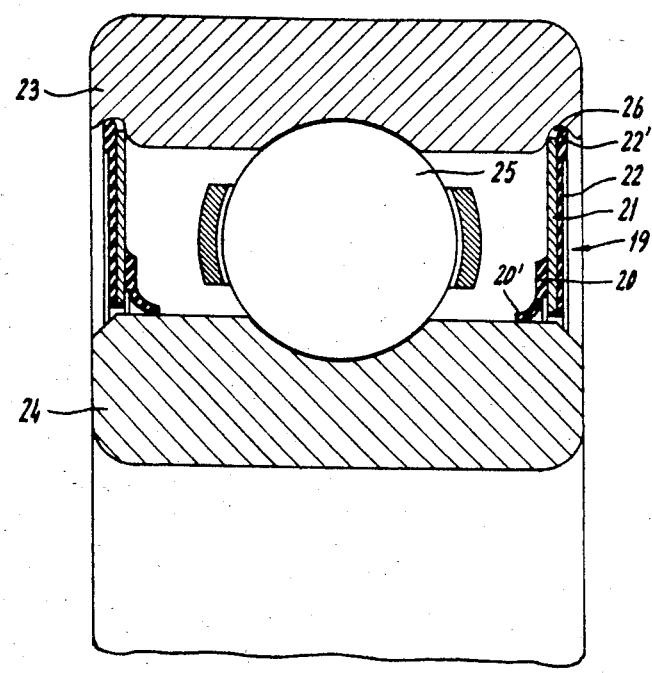

FIG. 2 shows another embodiment of the sealing ring pursuant to the invention, and FIG. 3 shows still another embodiment of the sealing ring pursuant to the invention.

As shown in FIG. 1, the rolling bearing comprises an outer race 1, an inner race 2 and one set of ball-shaped rolling members 3, placed between said races, a cage 4 likewise being present. At either edge the rolling bearing is closed off by sealing rings 5 and 5', which are entirely alike, so that only the sealing ring 5 will be described in greater detail.

The sealing ring 5 comprises an annular element 6 of a rigid material, for example a metal, having the shape of a flat ring. To said flat ring is attached the sealing element 7 of an elastic material, which likewise has the shape of a flat ring, the inner peripheral part 7' of said element projecting beyond the inner peripheral edge of the element 6 and being bent inward to rest against the inner race 2 of the rolling bearing. At the same time said part 7' is guided by the relatively narrow slot 8 between the inner peripheral edge of the element 6 and the inner race 2.

The outer peripheral part 7" of the sealing element 7 projects slightly past the outer peripheral edge of the element 6, so that said part 7" forms a snap connection for fixing the sealing ring 5 in the annular groove 9 in the outer race 1.

In FIG. 2 is shown a sealing ring 10 of a rolling bearing, which bearing consists of an outer race 11, an inner race 12 and a row of rolling members 13. The sealing ring 10 is fixed in an annular groove 14 in the outer race 11 in the same way as the sealing ring 5 in FIG. 1.

The sealing ring 10 comprises an element 15 of a rigid material, for example a metal, in the shape of a flat ring, to which is attached a sealing element 16 of an elastically deformable material. The sealing element 16 comprises a projecting edge 16", acting as a snap connection, and a turned-over inner peripheral part 16' which rests against the inner race 12. The inner peripheral edge of the part 16' is provided with a thickening 17, directed inward, while in this inner periphery is provided a plurality of notches 18, spaced apart, which notches, for example, are U-shaped.

In the sealing ring 19, shown in FIG. 3, the sealing element 20 is attached to the inner edge of the element 21 of a rigid material in the shape of a flat ring, while a second element 22 of an elastic material in the shape of a flat ring is attached to the other edge of the element 21, said element 22 having an edge 22' projecting beyond the outer peripheral edge of the element 21, which edge 22' again serves as snap connection for the sealing ring 19.

The rolling bearing again comprises an outer race 23, an inner race 24, and a plurality of rolling members 25. In the outer race 23 is again formed an annular groove 26 for accommodating the projecting edge 22'. The sealing element 20 comprises a part 20', bent inward, which rests against the inner race 24.

To bring the sealing rings 5, 10 and 19 shown in FIGS. 1, 2 and 3 into the bearing, a sealing ring is in each instance first placed on a mandrel or bar having a diameter coinciding with the outside diameter of the inner race, and then said mandrel is placed against the inner race and the sealing ring pushed off the mandrel.

I claim:

1. In a rolling bearing comprising inner and outer races and at least one row of rolling members between said races, said inner race having an outer cylindrical surface, said surface being grooved for contacting said rolling members, and sealing rings closing off the space between the races externally, each sealing ring including an annular element of a rigid material, the outer edge of which is accommodated in an annular groove in the outer race of the rolling bearing and a sealing element, attached thereto, of an elastic material comprising a lip-shaped part which, with respect to the annular element, projects inward and rests against the inner race of the rolling bearing, the improvement wherein the annular element is a flat ring which closes off the space between the races, except for a relatively narrow slot between its inner peripheral edge and the inner race, and the sealing element of an elastic material likewise has essentially the shape of a flat ring, the outer peripheral part of which and the element of a rigid material are joined, the inner peripheral part projecting beyond the inner periphery of said rigid element, which projecting part is directed inward, and the outer surface of which abuts against said outer cylindrical surface of said inner race, and including a plurality of spaced apart notches, the length and/or the thickness of said abutting part being greater than the breadth of the said slot.

2. Rolling bearing according to claim 1, wherein the inner peripheral part of the sealing element of elastic material is provided with a thickening directed inward.

3. Rolling bearing as in claim 1 wherein a second element of an elastic material in the shape of a flat ring is attached to the annular element, the peripheral edge of said second element projecting outside the peripheral edge of the annular element so that the sealing ring is snap fastened in the annular groove in the outer race.

4. Rolling bearing according to claim 3, wherein the second elastic element forms a whole with the sealing element.

5. A rolling bearing as claimed in claim 1, and further comprising an annular groove disposed in overlying relation with respect to said inner race, the outer edge of said rigid ring being engaged in said groove and contacting said outer race.

6. A sealing ring for use in a rolling bearing of the type which includes spaced inner and outer races, and at least one row of rolling members between the races, the outer race including an annular groove disposed in overlying relation with respect to the inner race, the sealing ring comprising an annular element in the shape of a flat ring, of a rigid material, and a sealing element of an elastic material, likewise having essentially the shape of a flat ring, attached thereto, the inner peripheral part of said sealing element projecting beyond the inner peripheral edge of the annular element of a rigid material and including a plurality of spaced apart notches.

7. Sealing ring according to claim 6 wherein a second element of an elastic material in the shape of a flat ring is attached to the annular element, the second element including an outer peripheral edge which projects outside the outer peripheral edge of the annular element of a rigid material.

8. Sealing ring according to claim 7, wherein the second element of an elastic material forms a whole with the sealing element.

9. Sealing ring according to claims 6 wherein the inner peripheral part of the sealing element is provided with a thickening.

10. Sealing ring according to claim 9 wherein a second element of an elastic material in the shape of a flat ring is attached to the annular element, the second element including an outer peripheral edge which projects outside the outer peripheral edge of the annular element of a rigid material.

11. Sealing ring according to claim 10, wherein the second element of an elastic material forms a whole with the sealing element.

12. In a rolling bearing including spaced inner and outer races, and at least one row of rolling members between the races, a sealing ring for closing the space between the races, said sealing ring comprising:

a rigid annular ring having an outer edge and an inner edge, said inner edge being spaced from the inner race to define a slot, and elastic sealing ring attached to said annular ring, said sealing ring including a flat ring portion, an outer peripheral part, and an inner peripheral part which extends beyond the inner edge of the annular ring, and being subject to projecting into the slot, and resting against the inner race, said inner peripheral part having a thickness greater than the breadth of the slot and including a plurality of spaced apart notches.

13. A rolling bearing according to claim 12, wherein the inner peripheral part of the sealing ring is thicker than the flat ring portion of the sealing ring.

14. A rolling bearing according to claim 12, wherein the outer race includes an annular groove disposed in overlying relation with respect to the inner race, and the outer peripheral part of the sealing ring projects outside the inner edge of the annular ring so that the sealing ring is snap fastened in the annular groove.

* * * * *